United States Patent
Shpak et al.

(10) Patent No.: US 9,260,352 B2
(45) Date of Patent: Feb. 16, 2016

(54) PLANT GROWTH MEDIUM

(71) Applicants: Nahum Shpak, Santa Maria, CA (US); Donna Shpak, Santa Maria, CA (US)

(72) Inventors: Nahum Shpak, Santa Maria, CA (US); Donna Shpak, Santa Maria, CA (US)

(*) Notice: Subject to any disclaimer, the term of this patent is extended or adjusted under 35 U.S.C. 154(b) by 0 days.

(21) Appl. No.: 14/624,408

(22) Filed: Feb. 17, 2015

(65) Prior Publication Data

US 2015/0158779 A1 Jun. 11, 2015

Related U.S. Application Data

(63) Continuation of application No. 13/261,009, filed as application No. PCT/US2011/049830 on Aug. 31, 2011, now Pat. No. 8,984,805.

(60) Provisional application No. 61/389,880, filed on Oct. 5, 2010.

(51) Int. Cl.
  *C05F 11/00* (2006.01)
  *A01G 9/10* (2006.01)
  *A01G 1/00* (2006.01)

(52) U.S. Cl.
  CPC ............. *C05F 11/00* (2013.01); *A01G 1/001* (2013.01); *A01G 9/1086* (2013.01)

(58) Field of Classification Search
  CPC ........................... A01G 13/0262; C09K 17/52
  USPC ....................................................... 47/59 S, 9
  See application file for complete search history.

(56) References Cited

U.S. PATENT DOCUMENTS

| | | | |
|---|---|---|---|
| 2,995,434 A | 8/1961 | Burton | |
| 3,063,823 A | 11/1962 | Kuhle | |
| 3,299,567 A * | 1/1967 | Perkins | E02B 3/121 118/325 |
| 4,116,663 A | 9/1978 | Ballou | |
| 4,250,662 A | 2/1981 | Rees | |
| 4,253,273 A | 3/1981 | Rees, Jr. | |
| 4,337,078 A | 6/1982 | Petrov | |
| 5,114,457 A | 5/1992 | Evans | |
| 5,238,909 A | 8/1993 | Welter | |
| 5,585,150 A * | 12/1996 | Sheehan | A01G 13/0262 428/15 |
| 7,587,856 B2 | 9/2009 | Rubin | |
| 2006/0070294 A1* | 4/2006 | Spittle | A01G 13/0268 47/9 |

(Continued)

FOREIGN PATENT DOCUMENTS

| | | |
|---|---|---|
| GB | 1168412 | 10/1969 |
| WO | 2012047416 | 4/2012 |

OTHER PUBLICATIONS

Sun Land Garden Products, Garden Soil, Soil Amendments, Fertilizer, Retail; http://www.sunlandgarden.com/retail-detail.php?id=8 &keywords=Redwood_Soil_Conditioner; downloaded May 14, 2012, 1 page.

(Continued)

*Primary Examiner* — Kristen C Hayes
*Assistant Examiner* — Morgan T Barlow
(74) *Attorney, Agent, or Firm* — Fitch, Even, Tabin & Flannery LLP

(57) ABSTRACT

A general purpose plant growth medium and planting methods incorporating shredded coastal redwood bark for use in planting. In some embodiments the shredded coastal redwood bark fibers vary in length from about 0.125-14 inches and comprise about 10-100% of the plant growth medium volume. In some embodiments the plant growth medium is compacted to an approximate unhydrated density of about 200-400 pounds per cubic yard.

17 Claims, 8 Drawing Sheets

(56) References Cited

U.S. PATENT DOCUMENTS

| | | | |
|---|---|---|---|
| 2006/0112629 A1 | 6/2006 | Wright | |
| 2007/0163169 A1* | 7/2007 | Spencer | C09K 17/52 47/9 |
| 2007/0180763 A1* | 8/2007 | Lougheed | A01G 13/0262 47/9 |
| 2007/0283620 A1* | 12/2007 | Karpik | A01G 13/0262 47/9 |
| 2008/0086940 A1* | 4/2008 | Nottingham | A01G 23/043 47/9 |
| 2008/0287295 A1 | 11/2008 | Rubin | |
| 2009/0265979 A1* | 10/2009 | Spittle | A01G 13/0262 47/9 |
| 2011/0167726 A1* | 7/2011 | Bouwens | A01G 31/001 47/59 S |
| 2011/0232173 A1* | 9/2011 | Lefebvre | A01G 13/0262 47/9 |
| 2011/0232188 A1* | 9/2011 | Kennedy | A01G 31/001 47/59 S |
| 2012/0186147 A1* | 7/2012 | Crivello | A01C 1/04 47/9 |
| 2013/0019525 A2 | 1/2013 | Shpak | |
| 2013/0180167 A1 | 7/2013 | Benim | |

OTHER PUBLICATIONS

Sun Land Garden Products, Professional Mixes for Commercial Use; 2010 Sun Land Garden products; http://web.archive.org/web/20100416152334/http://www.sunlandgarden.com; downloaded using Way Back Machine internet archive on Apr. 9, 2014.

Sun Land Garden Products, Soil amendments, potting mixes, custom blending; http://web.archive.org/web/20090529082329/http://sunlandgarden.com; downloaded using Way Back Machine internet archive on Apr. 9, 2014.

Wang, et al., "Growing the Best Phalaenopsis", Culture Corner; Orchids; www.aos.org Feb. 2007, 106-111.

Aguinaga Green, Planting Mix; http://aguinagagreen.com/Mulch,_Compost,_TopSoil,_and more/Planting_Mix.html; downloaded May 14, 2012, 1 page.

Brotherhood of Freedom; Long Beach Shavings Co. Inc. Soil Prep Redwood Soil Conditioner; http://www.brotherhoodoffreedom.com/supplemnt/SOIL+PREP+REDWOOD+SOIL+CONDITIONER; downloaded May 14, 2012; 2 pages.

Color Spot Nurseries; http://colorspot.com; downloaded May 14, 2012, 1 page.

Corkidi, et al., "Assessing the Inefectivity of Commercial Mycorrhizal Inoculants in Plant Nursery Conditions", J. Environ. Hort. 22(3):149-154, Sep. 2004; Department of Botany and Plant Sciences and Center for Conservation Biology, University of California, Riverside.

Ex Parte Quayle Action from U.S. Appl. No. 13/261,009 mailed Aug. 26, 2014.

Examiner Interview Summary from U.S. Appl. No. 13/261,009 mailed Oct. 20, 2014.

Harkin, et al. "Bark and Its Possible Uses", U.S. Department of Agriculture, Forest Service Forest Products Laboratory; Madison, WI 1971, 56 pages.

Higaki, et al., "Performance of Wood Products as Media for Culture of Anthuriums," Research Series 040; College of Tropical Agriculture and Human Resources, Universty of Hawaii; Sep. 1985 pp. 1-8.

Hines Growers; http://www.hineshort.com; downloaded May 14, 2012, 1 page.

http:www.simpleecology.com/.a/6a010535c7e18f970b1157099f8c6970b-pi; downloaded May 14, 2012, 1 page.

International Search Report and Written Opinion of the International Searching Authority for PCT/US2011/049830 mailed Apr. 27, 2012.

Non-Final Office Action from U.S. Appl. No. 13/261,009 mailed Apr. 9, 2014.

Norman's Nursery; http://www.nngrower.com/locations.html; downloaded May 14, 2012, 1 page.

Notice of Allowance from U.S. Appl. No. 13/261,009 mailed Nov. 19, 2014.

Restriction Requirement from U.S. Appl. No. 13/261,009 mailed Jan. 10, 2014.

Sheehan, T.J., Effects of Nutrtion and Potting Media on Growth and Flowering of Certain Epiphytic Orchids, FSHS; 1960, pp. 352-354.

Stephens, James M., "Minigardening (Growing Vegetables in Containers)", HS708; Horticultural Sciences Department, Florida Cooperative Extension Services, Institute of Food and Agricultureal Sciences, University of Florida Mar. 2010, 7 pages.

Johnson, Jr., et al., "Soilless Culture of Greenhouse Vegetables", http://ufdc.ufl.edu//UF00008515/00001; University of Florida Digital Collections; 25 pages; Dec. 9, 1987; Downloaded May 27, 2015.

* cited by examiner

PLANT GROWTH MEDIUM

CROSS-REFERENCE TO RELATED APPLICATIONS

This application is a continuation of U.S. application Ser. No. 13/261,009, filed Nov. 14, 2011, which is the National Stage of International Application No. PCT/US11/49830, filed Aug. 31, 2011, which claims the benefit of U.S. Provisional Application No. 61/389,880, filed Oct. 5, 2010, all of which are incorporated in their entirety herein by reference.

RELEVANT FIELD

This application is directed generally toward plant husbandry and more specifically toward plant growth mediums.

RELEVANT ART

Natural soils are generally unsuitable for growing plants, seeds, seedlings, cuttings in containers in commercial applications. For example, ordinary soils are often heavy, provide poor aeration, are difficult to maintain physiochemical uniformity and may introduce pathogens or other biological or chemical agents which impact the healthy growth of plants. These and other deficiencies increase labor, irrigation and treatment costs which impact commercial aspects of the growing enterprise.

To address the deficiencies of natural soils, many growers have turned to other non-soil substrates. However, use of non-soil growth substrates introduces other deficiencies which are difficult to manage particularly on a commercial scale. For example, coconut coir is suitable as a general purpose plant growth medium but requires importation from overseas suppliers which makes this growth medium particularly vulnerable to increases in fuel costs and import/export requirements. Likewise, rock wool may be used as a non-soil growth medium but tends to be high in pH requiring chemical pretreatment, lacks sufficient elasticity for compaction which increases transportation costs, requires significant energy input in its production and may otherwise leach metal or other undesirable ions which requires additional chemical additives to be included in irrigation water for certain sensitive plant species.

Accordingly, there is a need to provide a general purpose non-soil plant growth medium which addresses the above and other deficiencies of certain relevant art plant growth mediums.

SUMMARY

In view of the foregoing, various inventive embodiments of a general purpose plant growth medium are disclosed herein. In an inventive embodiment, a general purpose plant growth medium for growing for example, plants which produce fruit, vegetables and non-epiphytic cut flower products which utilizes shredded fibrous bark obtained from the redwood species *sequoia sempervirens*, commonly known as coastal redwood. In accordance with an inventive embodiment and contrary to conventional wisdom, the inventors have discovered that the shredded bark of coastal redwoods, when processed into fibers of various lengths, widths, and thicknesses provides a number of advantages as a plant growth medium which sustains and enhances the growth of a wide range of commercially important plants without having to pre-process the coastal redwood bark fibers for acidity or other physiochemical characteristics. For example, when compared to coconut coir, the inventors have further discovered that a growth medium using coastal redwood bark fibers has a greater useful life, is superior in terms of available water content, drainage and aeration, promotes more prolific root growth, earlier product production (e.g., flowers, vegetables, plant volume and/or fruit) resulting in generally healthier plants and produces a larger commercial yield over time with significantly less labor and physiochemical treatment than is afforded using coconut coir.

BRIEF DESCRIPTION OF DRAWINGS

The features and advantages of the various inventive embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described inventive embodiments without departing from the true scope and spirit of the inventive embodiments as is defined by the claims.

DETAILED DESCRIPTION

Figure 1A:
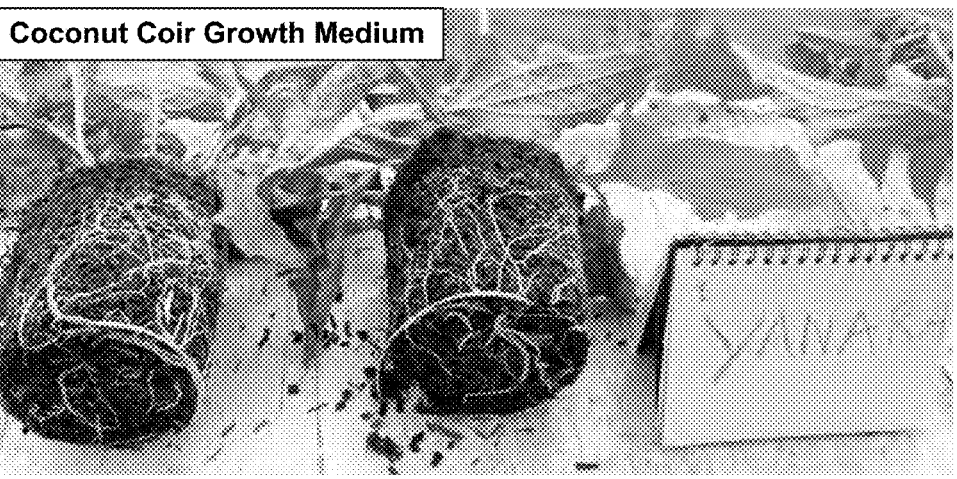
FIG. 1A—depicts a root structure of a plant of the variety *Gerbera* ("Yanara,") planted in a coconut coir growth medium in accordance with an inventive embodiment.

Various inventive embodiments of a plant growth medium are disclosed herein. In the following detailed description, numerous specific details are set forth in order to provide a thorough understanding of the present inventive embodiments. It will be apparent, however, to one skilled in the art that the present inventive embodiments may be practiced without these specific details. In other instances, well-known arrangements may be shown in block diagram form in order to avoid unnecessarily obscuring the present inventive embodiments.

An ideal plant growth medium should be well aerated and retentive of moisture, yet at the same time be sufficiently dense to structurally support juvenile and mature plants planted therein, without introducing deleterious chemical ions which might damage juvenile plants. The plant growth medium should also protect against invasive species, insects, nematodes, harmful bacteria, viruses and fungi. An ideal plant growth medium should also maintain these characteristics well over time and optimally be recyclable when no longer usable as a plant growth medium.

In an inventive embodiment, the inventors have discovered that shredded coastal redwood bark when processed into fibers in a range of about 0.125-14 inches has physiochemical properties that make this material desirable for use as a general purpose plant growth medium particularly suitable for use in containerized environments, hereinafter referred to as inventive growth medium. The length of the shredded coast redwood bark fibers should be sufficient to allow aeration and longevity while easily situated in a suitable container for planting. The inventive growth medium may be mixed with other organic and/or inorganic constituents.

In accordance with an inventive embodiment, the inventive growth medium may be sorted into arbitrary grades of coarse, medium, or fine fibers based primarily on length and/or volumetric density of the resulting coastal redwood bark fiber matrix. Sorting of the shredded coastal redwood bark fibers allows a grower to adjust the inventive growth medium to accommodate variations in irrigation and structural support requirements for a particular species of plant and/or growth stage of a plant.

For example, the volumetric density of various inventive embodiments of the inventive growth medium, affects the water retentive capacity, aeration and/or structural support of the plant. Through experimentation, the inventors have determined that the inventive growth medium for juvenile plants is more effective when fine to medium volumetric fiber structures are implemented, typically in a range of about 300-400 pounds per square yard (before external hydration), while more mature plants tend to prefer greater aeration afforded by medium or coarse inventive growth medium typically in a range of about pounds per square yard 200-300 pounds per square yard (before external hydration). The actual density implemented is also species sensitive based on aeration and/or hydration requirements of a particular plant species. Accordingly, some experimentation may be necessary to adjust the density of the inventive growth medium to optimally match the requirements of a particular plant species and/or corresponding growth stage of a plant. Blending and/or layering of the inventive growth medium may also be performed to optimize growth of a particular plant species.

Attributes of suitable physiochemical properties of the inventive growth medium according to the various inventive embodiments disclosed herein contribute little or no nutrients to a growing plant, does not absorb significant amounts of nutrients, is structurally uniform and resists decay. These physicochemical properties allow growers to carefully control and have knowledge of the exact nutrient mix provided to plants at all times through supplementary nutrient-delivery systems such as are commonly found in commercial growing facilities. Therefore, nutrients and fertilizers may be selectively provided as necessary for plant development, without the need to consider the contribution from or absorption of the inventive growth medium disclosed herein. Pretreatment for acidity is not required. However, if desired for a particularly sensitive plant species, treatment of the inventive growth medium may be accomplished in situ by way of irrigation.

In contrast with some of the beneficial physicochemical properties of the inventive plant growth medium described herein, coconut coir, commonly used as a plant growth medium binds more tightly with water than the inventive plant growth medium, leaving less water available for use by plants and thus requires more frequent irrigation. In addition, coconut coir contains higher leachable sodium and potassium levels making it less suitable for a great number of plant species that are sensitive to these monovalent ions without expensive pretreatment. Moreover, the fibrous consistency of coconut coir is highly variable requiring a grower to adjust treatment and irrigation specifically for each batch received before planting. Lastly, coconut coir degrades significantly over time resulting in an unusable vegetative waste which has no post growth medium usage and thus adds to organic waste disposal at a sanitary landfill.

Table 1 below provides laboratory results of water retention values for coconut coir (CC) and the inventive growth mediums for a standard (3 liter) container commonly used for growing various varieties of the flowering plant *Gerbera*. As shown below, the inventive growth medium (RB) binds significantly less tightly to water which facilitates greater absorption by plants. As is known in the relevant art, growth media binding tensions greater than 50 centibars impairs plant growth.

To avoid stressing plants using the coconut coir growth medium, more frequent irrigation is required. The initially lower water retention values of the inventive growth medium may optionally be overcome by treating the inventive growth medium with a surfactant. Alternately, or in combination with surfactant use, mixtures of coarse, medium and/or finely shredded fibers of the inventive growth medium may be used to provide greater initial water retention.

TABLE 1

| | Coconut Coir (CC) Coarse Coastal Redwood Bark (RB) | | | | | | | |
|---|---|---|---|---|---|---|---|---|
| | CC | RB | CC | RB | CC | RB | CC | RB |
| Centibars Suction (cb) | 0 | 0 | 2 | 2 | 10 | 10 | 50 | 50 |
| Water Retention (% vol.) | 44.0 | 40.6 | 29.9 | 12.0 | 27.5 | 9.7 | 26.5 | 8.1 |

TABLE 1-continued

| | Coconut Coir (CC) Coarse Coastal Redwood Bark (RB) | | | | | | | |
|---|---|---|---|---|---|---|---|---|
| | CC | RB | CC | RB | CC | RB | CC | RB |
| Available Water (% vol.) | 17.4 | 32.5 | | | | | | |
| Max Available Water (% vol.) | 30.7 | 36.5 | | | | | | |

Data obtained from Soil & Plant Laboratory, Inc - laboratory report "*Gerbera Medai* - Physical Properties Comparison - Coco vs. Redwood Bark dated Aug. 31, 2007." Said report is hereby incorporated by reference in its entirety as if fully set forth herein.

EXAMPLE 1

Figure 1B:
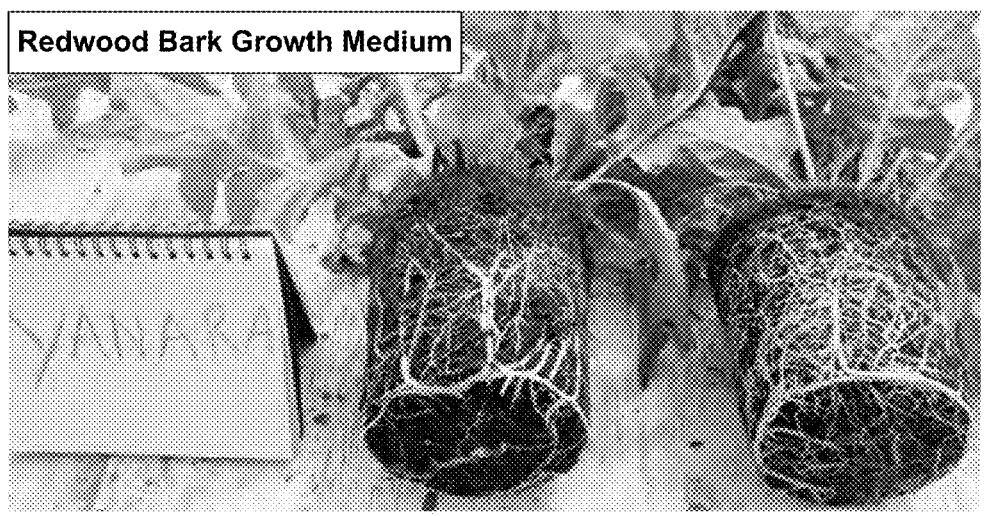
FIG. 1B—depicts a root structure of a plant of the variety *Gerbera* ("Yanara,") planted in an inventive coastal redwood bark growth medium in accordance with an inventive embodiment.

Referring to FIGS. 1A&B, root structures of plants of the variety *Gerbera* ("Yanara,") planted in coconut coir and the inventive growth mediums are depicted. This variety of *Gerbera* produces large ornamental red daisy flowers. In FIG. 1A, the root structures after approximately 90 days of growth of the *Gerbera* using coconut coir as a plant growth medium are comparatively less well developed or prolific than the *Gerbera* grown in the inventive growth medium as depicted in FIG. 1B for an equivalent time period of approximately 90 days. The tests were grown in a traditional greenhouse environment using normal irrigation without attempts to optimize for either the coconut coir or the inventive growth medium and under controlled growing conditions in terms of temperature and solar illumination. A greenhouse environment is not required in the use of the inventive growth medium.

EXAMPLE 2

Figure 2A:
FIG. 2A—depicts leaf and flower structures of a plant of the variety *Gerbera* ("Yanara,") planted in a coconut coir growth medium in accordance with an inventive embodiment.
Figure 2B:
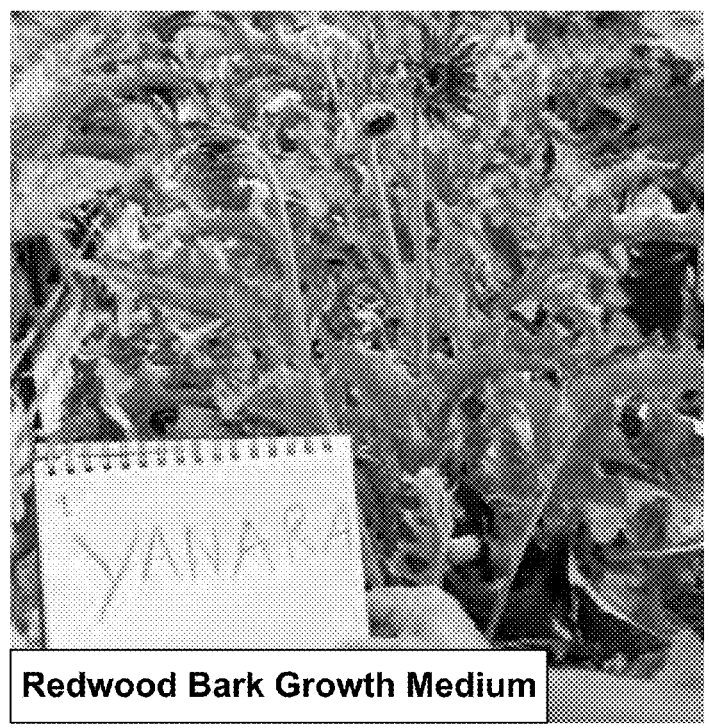
FIG. 2B—depicts a leaf and flower structures of a plant of the variety *Gerbera* ("Yanara,") planted in an inventive coastal redwood bark growth medium in accordance with an inventive embodiment.

Referring to FIGS. 2A&B, leaf and flower structures of plants of the variety *Gerbera* ("Yanara,") planted in coconut coir and the inventive growth mediums are depicted. In FIG. 2A, the leaf and flower structures after approximately 90 days of growth of the *Gerbera* using coconut coir as a plant growth medium are less extensive with far fewer flowers than the *Gerbera* grown in the inventive growth medium as depicted in FIG. 2B for an equivalent time period of approximately 90 days. As before, the tests were grown in a traditional greenhouse environment using normal irrigation without attempts to optimize for either the coconut coir or the inventive growth medium and under controlled growing conditions in terms of temperature and solar illumination. A greenhouse environment is not required in the use of the inventive growth medium.

EXAMPLE 3

Figure 3A:
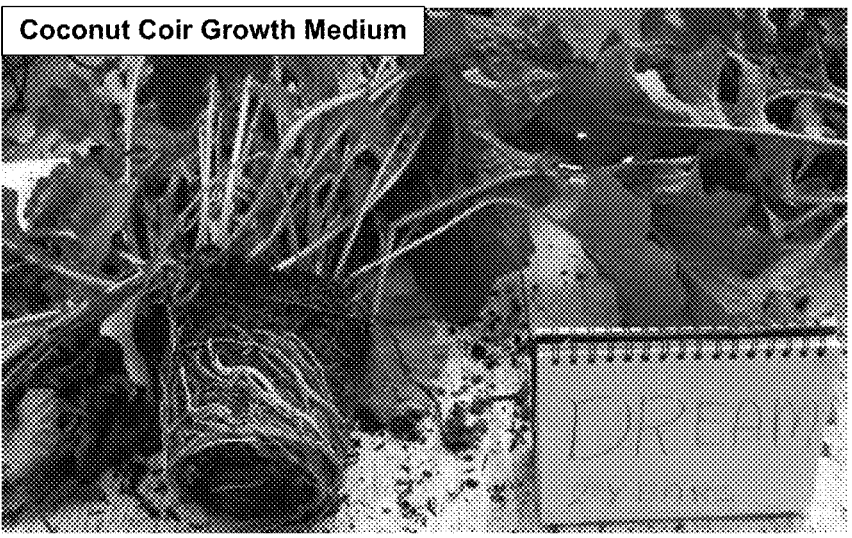
FIG. 3A—depicts a root structure of a plant of the variety *Gerbera* ("Dream,") planted in a coconut coir growth medium in accordance with an inventive embodiment.
Figure 3B:
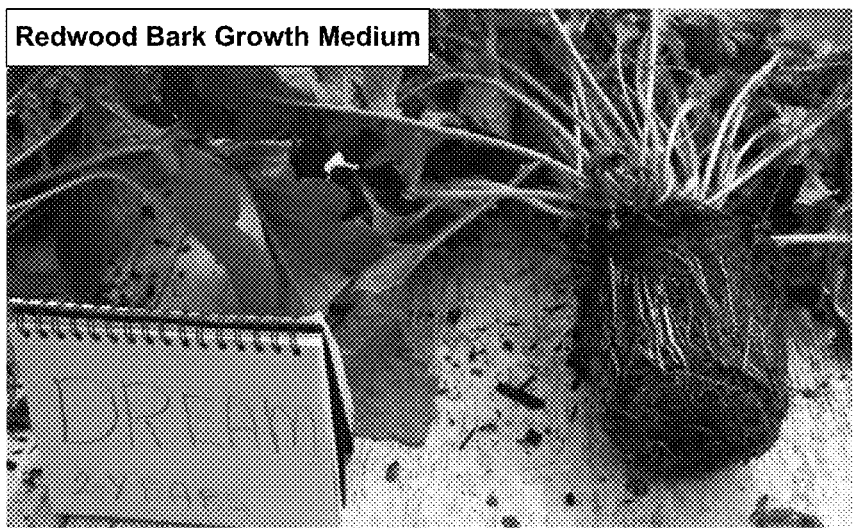
FIG. 3B—depicts a root structure of a plant of the variety *Gerbera* ("Dream,") planted an inventive coastal redwood bark growth medium in accordance with an inventive embodiment.

Referring to FIGS. 3A&B, root structures of plants of another variety of *Gerbera* ("Dream,") planted in coconut coir and the inventive growth mediums are depicted. This variety of *Gerbera* produces ornamental pink daisy flowers. In FIG. 3A, the root structures after approximately 2 years of growth of the *Gerbera* using coconut coir as a plant growth medium are about the same as the *Gerbera* grown in the inventive growth medium depicted in FIG. 3B for an equivalent time period of approximately 2 years. However, as is evident in FIG. 3A, the coconut coir growth medium has deteriorated to a more vegetative state with considerably higher water content of approximately 80% by volume while the inventive growth medium depicted in FIG. 3B remains steerable and generally intact, with a water content of approximately 55% by volume. As before, the tests were grown in a traditional greenhouse environment using normal irrigation without attempts to optimize for either the coconut coir or the inventive growth medium and under controlled growing conditions in terms of temperature and solar illumination. A greenhouse environment is not required in the use of the inventive growth medium.

EXAMPLE 4

Figure 4A:
FIG. 4A—depicts a leaf structure of a plant of the variety *Gerbera* ("Popov"), planted in a coconut coir growth medium in accordance with an inventive embodiment.
Figure 4B:
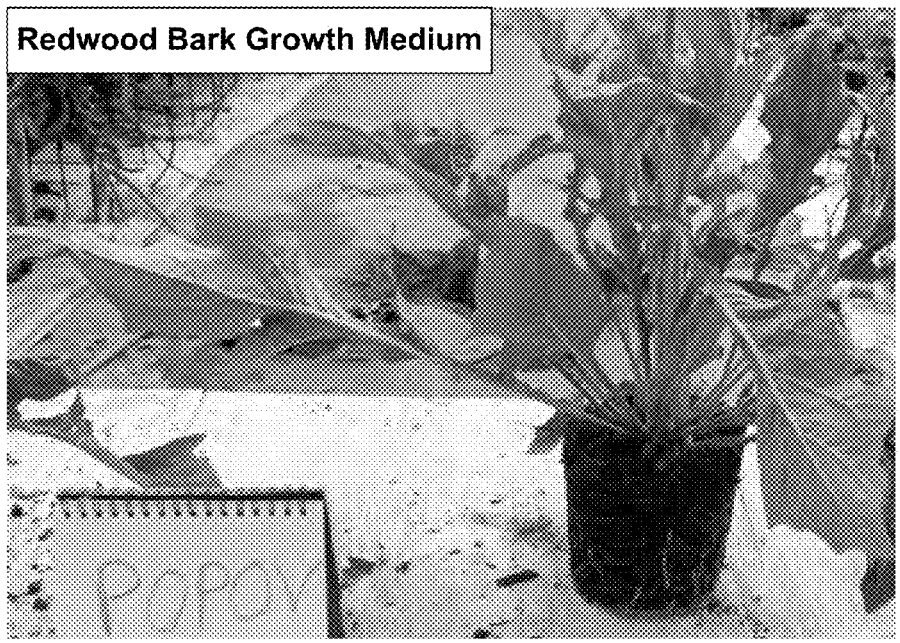
FIG. 4B—depicts a leaf structure of a plant of the variety *Gerbera* ("Popov"), planted in an inventive coastal redwood bark growth medium in accordance with an inventive embodiment.

Referring to FIGS. 4A&B, leaf and flower structures of plants of another variety of *Gerbera* ("Popov,") planted in coconut coir and the inventive growth mediums are depicted. In FIG. 4A, the leaf and flower structures after approximately 90 days of growth of the *Gerbera* using coconut coir as a plant growth medium are less extensive and producing far fewer flowers than the *Gerbera* grown in the inventive growth medium depicted in FIG. 4B for an equivalent time period of approximately 90 days. As before, the tests were grown in a traditional greenhouse environment using normal irrigation without attempts to optimize for either the coconut coir or the inventive growth medium and under controlled growing conditions in terms of temperature and solar illumination. A greenhouse environment is not required in the use of the inventive growth medium.

EXAMPLE 5

Figure 5A:
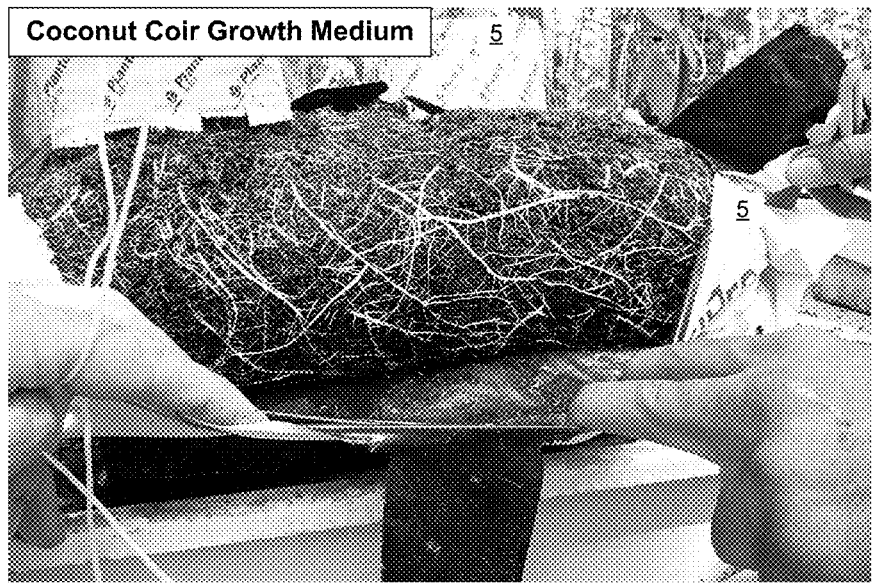
FIG. 5A—depicts a root structure of an English cucumber plant planted in a coconut coir growth medium in accordance with an inventive embodiment.
Figure 5B:
FIG. 5B—depicts a root structure of an English cucumber plant planted in inventive coastal redwood bark growth medium in accordance with an inventive embodiment.

Referring to FIGS. 5A&B, root structures of plants of English cucumber plants ("*Cucumis sativus*") planted in coconut coir and the inventive growth mediums are depicted. In FIG. 5A, the root structures after equivalent growth periods using coconut coir as a plant growth medium are comparatively less well developed or prolific than the cucumber plant grown in the inventive growth medium as depicted in FIG. 5B. As before, the tests were grown in a traditional greenhouse environment using normal irrigation without attempts to optimize for either the coconut coir or the inventive growth medium and under controlled growing conditions in terms of temperature and solar illumination. A commercial probiotic product (e.g., "Bokashi") was added to plants in both growth mediums. Other probiotic products known in the relevant art may be used as well. A greenhouse environment is not required in the use of the inventive growth medium.

EXAMPLE 6

Figure 6A:
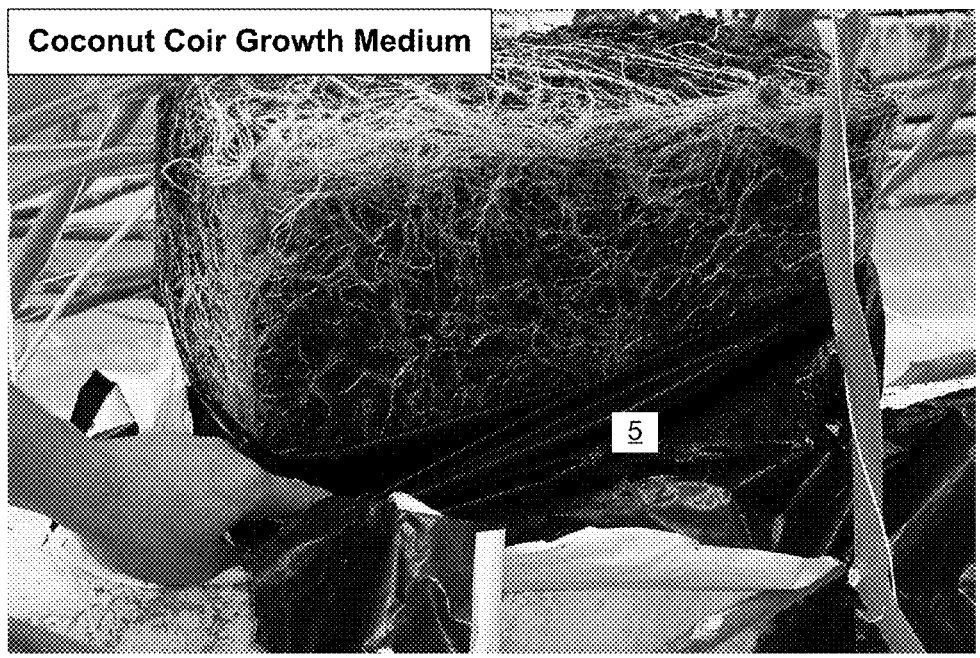
FIG. 6A—depicts a root structure of a Beef Steak Tomato plant planted in a coconut coir growth medium in accordance with an inventive embodiment.
Figure 6B:
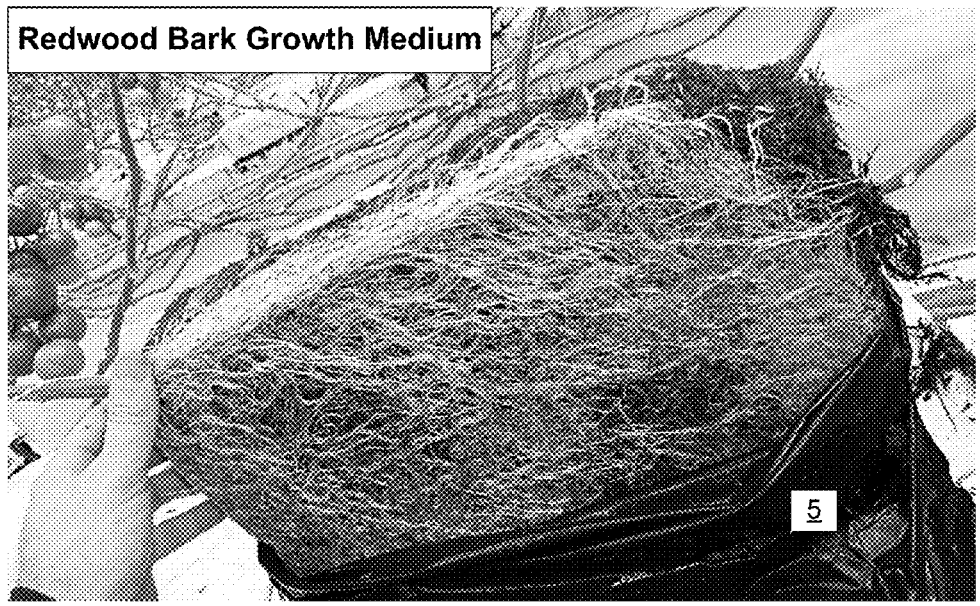
FIG. 6B—depicts a root structure of a Beef Steak Tomato plant planted in an inventive coastal redwood bark growth medium in accordance with an inventive embodiment.

Referring to FIGS. 6A&6B, root structures of plants of Beef Steak Tomato plant ("*Solanum lycopersicum*") planted in coconut coir and the inventive growth medium is depicted. In FIG. 6A, the root structures after equivalent growth periods using coconut coir as a plant growth medium are comparatively less well developed or prolific than the Beef Steak Tomato plant grown in the inventive growth medium as depicted in FIG. 6B. The Beef Steak Tomato plants shown in FIGS. 6A, 6B were grown in a traditional greenhouse environment using normal irrigation without attempts to optimize for either the coconut coir or the inventive growth medium and under controlled growing conditions in terms of temperature and solar illumination. A greenhouse environment is not required in the use of the inventive growth medium.

EXAMPLE 7

Figure 7A:
FIG. 7A—depicts a healthy root structure of an English Cucumber plant planted in an inventive coastal redwood bark growth medium in accordance with an inventive embodiment.
Figure 7B:
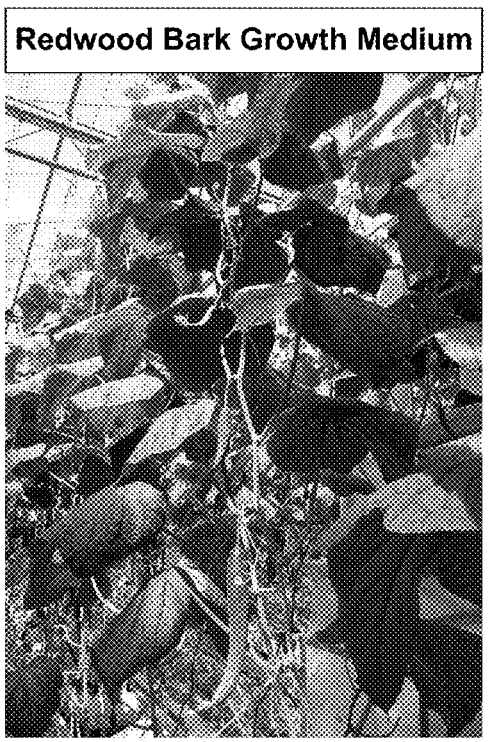
FIG. 7B—depicts a healthy growth structure of an English Cucumber plant planted in an inventive coastal redwood bark growth medium in accordance with an inventive embodiment.
Figure 7C:
FIG. 7C—depicts a healthy leaf structure of an English Cucumber plant planted in an inventive coastal redwood bark growth medium in accordance with an inventive embodiment.

Referring to FIGS. 7A-C healthy growth structures of an English Cucumber plant ("*Cucumis sativus*") planted in the inventive growth medium is depicted. In FIG. 7A, the root structure of the English Cucumber plant is depicted. In this view, the cucumber's root structure has fully infiltrated the inventive growth medium. The health of the English Cucumber plant is clearly shown in FIGS. 7B-C. Also as shown in FIGS. 7B-C, the English Cucumber plant is grown in a traditional greenhouse environment for commercial production purposes. As before, a greenhouse environment is not required in the use of the inventive growth medium. Accordingly, a wide range of commercially significant crops can be grown in the inventive growth medium and not limited to the examples shown in the figures.

Figure 8:
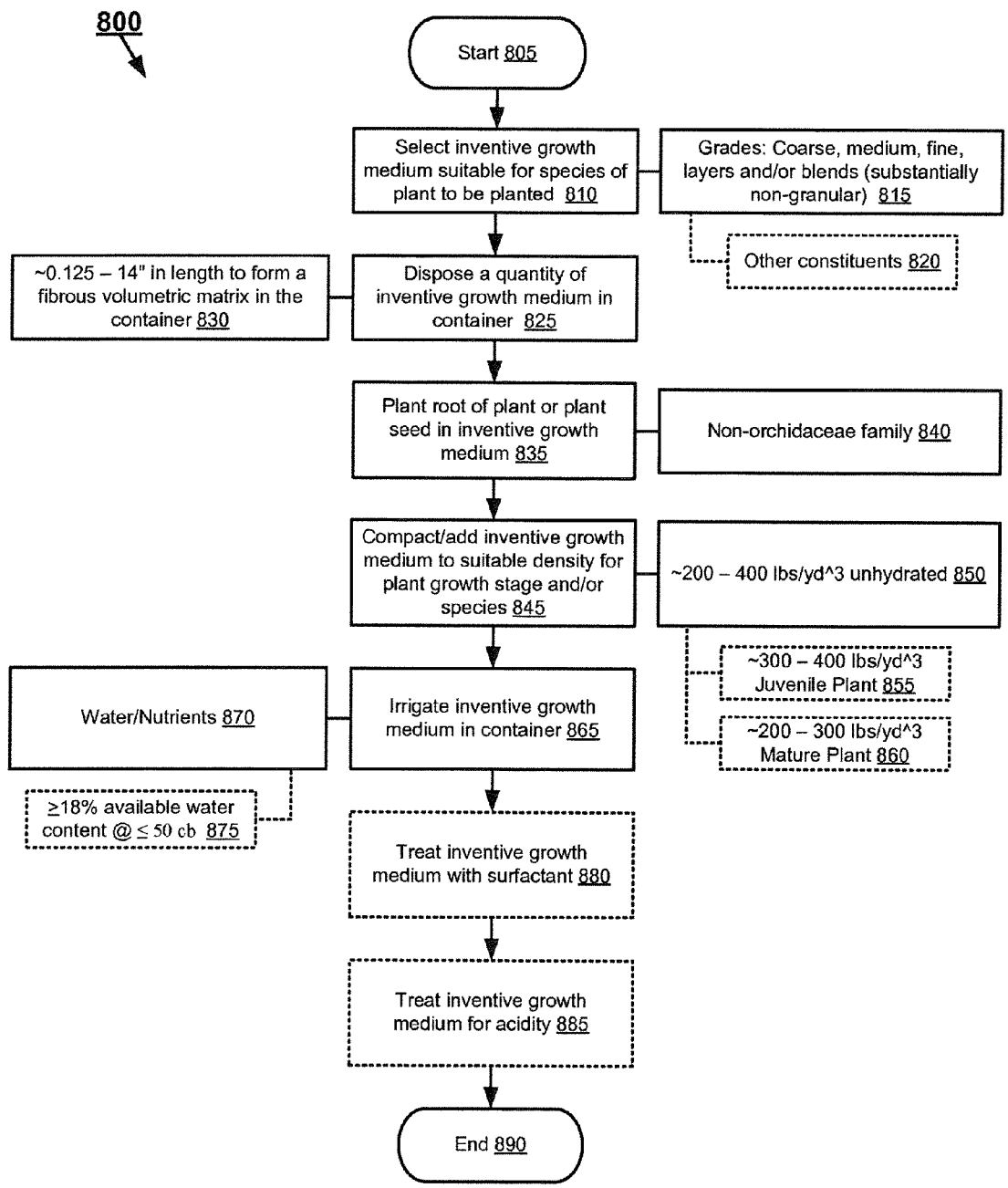
FIG. 8—depicts a flow chart of a method for using an inventive coastal redwood bark growth medium in accordance with an inventive embodiment.

Referring to FIG. 8, a flow chart 800 of an inventive embodiment method 800 for using an embodiment of the inventive growth medium is depicted. Items shown in dotted blocks indicate optional steps in using the inventive growth medium. The method 800 is initiated at step 805 by selecting an inventive growth medium suitable for a species of plant to be planted in an embodiment of the inventive growth medium 810. The selected grade of inventive growth medium may comprise coarse, medium, fine, layers and/or blends of coarse, medium and/or finely shredded fibers 815. The fibers of the inventive growth media are substantially non-granular in structure to allow for greater aeration and longevity of the inventive growth media. For purposes of this specification, "substantially non-granular" refers to shredded coastal redwood bark fibers in which the length of the fibers are greater than widths of the fibers.

In an inventive embodiment, the inventive growth medium may also be mixed with other constituents 820. By way of example and not limitation, probiotics (e.g., Bokashi), organic and/or inorganic materials for supplying nutrients, augmenting water retention and/or improving aeration. In such exemplary mixtures, the inventive growth medium in non-granulated form may be used in any desired proportion from about 10 to about 100 percent by volume, preferably from 10 to about 80 percent by volume and more preferably from about 30 to about 80 percent by volume and even more preferably greater than 60 percent by volume and up to 100 percent shredded coastal redwood bark fibers.

At step 825, once a suitable inventive growth medium has been selected, a quantity of an embodiment of the inventive growth medium is disposed in a container 5. The inventive growth medium may have shredded coastal redwood bark fibers ranging in length of anywhere from ~0.125-14 inches and arranged in the container 5 to form a fibrous volumetric matrix 830 sufficient to at least partially file the container 5. The type of container 5 used is not critical, by way of example and not limitation, standard open top containers, growth bags, troughs, lined trenches isolated from a native soil and like structures 5 may be used to contain the inventive growth medium.

At step 835, a root of the plant is then planted in the inventive growth medium to a sufficient depth to at least provide structural support to the plant for growing purposes. In an inventive embodiment, the plant to be planted in the inventive growth medium excludes members of the orchidaceae family 840. As such, the inventive growth medium is suitable for example, plants which produce fruit, vegetables and non-epiphytic cut flower products. At step 845, once the root of the plant has been planted in the inventive growth medium, the inventive growth medium may be compacted to a suitable density for the species and/or growth stage of the plant to be grown in the inventive growth medium.

Additional inventive growth medium may be added to sufficiently fill the container 5 during or after compaction where necessary. Compaction, where necessary, may be accomplished by hand or mechanically. In certain instances, the container 5 itself provides sufficient compaction (e.g., growth bags) by way of resilience of the construction materials which form the container 5.

In an inventive embodiment, compaction of the inventive growth medium is approximately 200-400 pounds per cubic yard when unhydrated by external water sources 850. Some residual moisture content may be present in the inventive growth medium due to processing, biological activity and/or precipitation. Depending on the species of plant and its growth stage, a preferred compaction density is in a range of approximately 300-400 pounds per cubic yard for juvenile plants 855 and approximately 200-300 pounds per cubic foot for mature plants 860. These ranges may vary somewhat depending on the species of the plant and are entirely optional. As discussed above with respect to step 815, blends and/or layers of the various grades of the inventive growth medium may be utilized to optimize growth of a particular plant variety or species.

At step 865, once a suitable compaction density is achieved, the inventive growth media should be irrigated to supply necessary nutrients and hydration 870 to the plant. Irrigation should initially provide at least 18% available water at up to 50 centibars to the plant placed in the inventive growth medium 875. Again, the actual available water content may be varied by changing the grade of the inventive growth medium to optimize growth of a particular plant variety or species.

Optionally at step 880, the inventive growth medium may be treated with a surfactant to improve water retention either in the irrigation flow or separately. Likewise, optionally at step 885, the inventive growth medium may be treated with a neutralizing agent to reduce acidity after planting. The neutralizing agent may be provided in the irrigation flow or separately. Once the above steps have been completed, the method ends at step 890.

As is common in commercial growing environments, for example greenhouses, drainage from the containers 5 housing the plants using the inventive growth medium may be recycled to reduce water and treatment costs. Once the inventive growth medium becomes unsuitable for planting, the residual may still be used as a ground cover and/or as a soil amendment.

INDUSTRIAL APPLICATION

The various inventive embodiments of a plant growth medium have industrial applicably for agricultural and horticultural activities. By way of example and not limitation, embodiments of the plant growth medium may be used to replace coconut coir and/or rock wool as a planting substrate and is particularly suited for controlled growing environments. The various inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that the plant growth medium may be combined with other growth mediums, soils and/or compositions. No specific limitation is intended to a particular shredded coastal redwood bark fiber mixture or usage sequence described. Other variations and inventive embodiments are possible in light of the above teachings, and it is not intended that the inventive scope be limited by this specification, but rather by the Claims following herein.

What is claimed:

1. A plant planted in a containerized plant growth medium, wherein the plant is a non-epiphyte and is not a member of the orchidaceae family, and
wherein the plant growth medium comprises shredded coastal redwood bark fibers, said shredded fibers having lengths of about 0.125 inches to about 14 inches and widths less than their lengths, said plant growth medium having sufficient physiochemical properties to sustain a plant when planted therein.

2. The plant planted in the containerized plant growth medium of claim 1 wherein the plant growth medium is substantially free of soil and said sufficient physiochemical properties of the plant growth medium include an unhydrated density in a range of about 200-400 pounds per cubic yard.

3. The plant planted in the containerized plant growth medium of claim 1 wherein said plant growth medium comprises at least 10 percent by volume of said shredded coastal redwood bark fibers.

4. The plant planted in the containerized plant growth medium of claim 1 wherein said sufficient physiochemical properties includes an acidic pH when hydrated.

5. The plant planted in the containerized plant growth medium of claim 1 wherein said plant growth medium comprises greater than 60 percent by volume of said shredded coastal redwood bark fibers.

6. The plant planted in the containerized plant growth medium of claim 1 wherein the plant growth medium consists essentially of shredded coastal redwood bark fibers with lengths of about 0.125-14 inches.

7. The plant planted in the containerized plant growth medium of claim 1 wherein said plant growth medium is contained in a bag, a trough, or a container.

8. The plant planted in the containerized plant growth medium of claim 1, wherein the plant growth medium comprises at least a first grade and a second grade different from the first grade.

9. The plant planted in the containerized plant growth medium of claim 8, wherein the first grade and the second grade are arranged in layers.

10. The plant planted in the containerized plant growth medium of claim 1, wherein the shredded coastal redwood bark fibers are a mixture of coarse, medium, and finely shredded fibers.

11. The plant planted in the containerized plant growth medium of claim 1, wherein the plant growth medium further comprises at least one of probiotics, organic materials, and inorganic materials.

12. A method of planting a plant in a containerized plant growth medium having sufficient physiochemical properties to sustain the plant when planted therein, comprising:
disposing a quantity of the plant growth medium, the plant growth medium comprising shredded coastal redwood bark fibers having lengths of about 0.125 inches to about 14 inches and widths less than their lengths, in a container;
compacting the plant growth medium to an unhydrated density in a range of about 200 to about 400 pounds per cubic yard; and
planting a non-epiphytic plant that is not a member of the orchidaceae family within said plant growth medium.

13. The method of claim 12 further comprising disposing said plant growth medium in said container to a density generally in a range of about 200-300 pounds per cubic yard.

14. The method of claim 12, further comprising the step of irrigating the plant.

15. The method of claim 14, further comprising the step of treating the plant growth medium with a surfactant.

16. The method of claim 14, further comprising the step of treating the plant growth medium with a neutralizing agent.

17. The method of claim 12, wherein the plant growth medium consists essentially of the shredded coastal redwood bark fibers.

* * * * *